United States Patent
Fokin et al.

(10) Patent No.: US 11,257,373 B2
(45) Date of Patent: Feb. 22, 2022

(54) AVOIDANCE OF COLLISION WITH CROSS-TRAFFIC

(71) Applicant: Bayerische Motoren Werke Aktiengesellschaft, Munich (DE)

(72) Inventors: Alexey Fokin, Munich (DE); Christine Kock, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 318 days.

(21) Appl. No.: 16/538,964

(22) Filed: Aug. 13, 2019

(65) Prior Publication Data
US 2019/0362632 A1    Nov. 28, 2019

Related U.S. Application Data

(63) Continuation of application No. PCT/EP2018/052950, filed on Feb. 6, 2018.

(30) Foreign Application Priority Data

Feb. 15, 2017   (DE) ..................... 10 2017 202 415.1

(51) Int. Cl.
   *G08G 1/16*   (2006.01)
   *B60T 7/12*   (2006.01)

(52) U.S. Cl.
   CPC ............... *G08G 1/166* (2013.01); *B60T 7/12* (2013.01); *B60T 2210/32* (2013.01); *B60T 2220/04* (2013.01); *B60T 2250/04* (2013.01)

(58) Field of Classification Search
   CPC .... B60W 30/06; B60W 30/08; B60W 30/095; B60W 30/0953; B60W 30/0956;
   (Continued)

(56) References Cited

U.S. PATENT DOCUMENTS

| | | | |
|---|---|---|---|
| 7,124,027 B1 * | 10/2006 | Ernst, Jr. ............... | G01S 13/931 701/301 |
| 9,646,428 B1 * | 5/2017 | Konrardy ............. | B60W 40/09 |

(Continued)

FOREIGN PATENT DOCUMENTS

| | | | | |
|---|---|---|---|---|
| CN | 105539434 A | * | 5/2016 | ........ B60W 30/0956 |
| CN | 108162760 A | * | 6/2018 | ............. G08G 1/165 |

(Continued)

OTHER PUBLICATIONS

International Search Report (PCT/ISA/210) issued in PCT Application No. PCT/EP2018/052950 dated May 7, 2018 with English translation (four (4) pages).

(Continued)

*Primary Examiner* — Atul Trivedi
(74) *Attorney, Agent, or Firm* — Crowell & Moring LLP

(57) ABSTRACT

A method avoids a collision of a motor vehicle initially moving backwards or forwards, in particular leaving a parking place, with cross-traffic. The method detects whether there is a risk of collision with cross-traffic; determines a last possible braking intervention for ensuring avoidance of collision when there is a risk of collision with cross-traffic; and performs an automatic last possible initiation of a braking intervention for preventing the collision in the event of an identified risk of collision, if avoidance of the collision is ensured thereby.

8 Claims, 2 Drawing Sheets

(58) Field of Classification Search
CPC ...... B60W 10/06; B60W 10/18; B60W 10/20; B60W 2554/00; B60T 7/12; B60T 2220/04; B60T 2250/04; B60T 2210/32; G08G 1/166; G08G 1/168
USPC .......................................................... 701/70
See application file for complete search history.

(56) References Cited

U.S. PATENT DOCUMENTS

| | | | |
|---|---|---|---|
| 9,701,307 B1* | 7/2017 | Newman | B60W 10/184 |
| 2004/0030497 A1 | 2/2004 | Knoop et al. | |
| 2007/0279199 A1 | 12/2007 | Danz et al. | |
| 2008/0306666 A1 | 12/2008 | Zeng et al. | |
| 2014/0032094 A1* | 1/2014 | Heinrichs-Bartscher | B60W 30/0953 701/301 |
| 2014/0055099 A1 | 2/2014 | Kuok et al. | |
| 2014/0303845 A1* | 10/2014 | Hartmann | B60W 10/20 701/41 |
| 2014/0309884 A1* | 10/2014 | Wolf | B60W 10/04 701/41 |
| 2014/0368324 A1* | 12/2014 | Seifert | B60Q 1/444 340/435 |
| 2015/0166062 A1* | 6/2015 | Johnson | B60W 10/20 701/41 |
| 2016/0318445 A1* | 11/2016 | Sugimoto | B60W 60/0027 |
| 2016/0347310 A1* | 12/2016 | Moran | G08G 1/16 |
| 2017/0236423 A1* | 8/2017 | Bowers | G08G 1/16 340/903 |
| 2017/0248949 A1* | 8/2017 | Moran | G08G 1/165 |
| 2017/0248950 A1* | 8/2017 | Moran | G05D 1/0055 |
| 2017/0369055 A1* | 12/2017 | Saigusa | G08G 1/0116 |
| 2018/0141545 A1* | 5/2018 | Freytag | A61B 5/08 |
| 2019/0202450 A1* | 7/2019 | Maeda | B60W 30/09 |
| 2020/0005649 A1* | 1/2020 | Kim | G06K 9/00812 |
| 2020/0108808 A1* | 4/2020 | Zhou | B60T 8/72 |
| 2020/0180612 A1* | 6/2020 | Finelt | G05D 1/0246 |
| 2020/0216062 A1* | 7/2020 | Hakki | B64C 15/14 |
| 2020/0353863 A1* | 11/2020 | Weksler | B60Q 9/008 |
| 2021/0031762 A1* | 2/2021 | Matsunaga | G08G 1/16 |
| 2021/0061264 A1* | 3/2021 | Stefan | B60W 60/00184 |
| 2021/0094577 A1* | 4/2021 | Shalev-Shwartz | G06T 7/20 |
| 2021/0139018 A1* | 5/2021 | Schwindt | H04W 4/48 |
| 2021/0197858 A1* | 7/2021 | Zhang | B60W 30/18163 |
| 2021/0256616 A1* | 8/2021 | Hayward | G06Q 10/10 |

FOREIGN PATENT DOCUMENTS

| | | | | |
|---|---|---|---|---|
| CN | 110395251 A | * | 11/2019 | |
| CN | 110481543 A | * | 11/2019 | |
| DE | 10 2012 208 998 A1 | | 12/2013 | |
| DE | 10 2013 213 630 A1 | | 4/2014 | |
| DE | 102013204893 A1 | * | 9/2014 | .......... B60T 8/17558 |
| DE | 10 2016 208 217 A1 | | 11/2016 | |
| DE | 102017202415 A1 | * | 8/2018 | ........ B60W 30/0956 |
| DE | 102018203063 A1 | * | 9/2019 | ........ B60W 30/0953 |
| DE | 102018203070 A1 | * | 9/2019 | ............ G08G 1/166 |
| JP | 2016151828 A | * | 8/2016 | ............ G08G 1/165 |
| WO | WO 03/007271 A2 | | 1/2003 | |
| WO | WO 2011/092229 A1 | | 8/2011 | |
| WO | WO-2015033196 A1 | * | 3/2015 | ............ B60W 30/09 |
| WO | WO-2016189112 A1 | * | 12/2016 | ........ B60W 30/0956 |

OTHER PUBLICATIONS

German-language Written Opinion (PCT/ISA/237) issued in PCT Application No. PCT/EP2018/052950 dated May 7, 2018 (five (5) pages).

German-language Search Report issued in counterpart German Application No. 102017202415.1 dated Dec. 20, 2017 with partial English translation (12 pages).

Continental Automotive GMBH., "Simply Safer Park Backwards—Ausparkhilfe", Continental Automotive-Parking Assistance, Retrieved from: https://www.continental-automotive.com/de-de/Passenger-Cars/Chassis-Safety/Advanced-Driver-Assistance-Systems/Driving-Functions/Rear-Cross-Traffic-Alert, Dec. 5, 2017 (one (1) page).

* cited by examiner

AVOIDANCE OF COLLISION WITH CROSS-TRAFFIC

CROSS REFERENCE TO RELATED APPLICATIONS

This application is a continuation of PCT International Application No. PCT/EP2018/052950, filed Feb. 6, 2018, which claims priority under 35 U.S.C. § 119 from German Patent Application No. 10 2017 202 415.1, filed Feb. 15, 2017, the entire disclosures of which are herein expressly incorporated by reference.

BACKGROUND AND SUMMARY OF THE INVENTION

The invention relates to a method for avoiding a collision of an initially rearward or forward traveling motor vehicle with cross-traffic, for example when moving rearward or forward out of a transverse parking space or when driving out of an entry.

The prior art has already disclosed methods for avoiding a collision in which, when driving out of a parking space, the driver is provided with warning messages if the risk of a collision as a result of cross-traffic is detected. This is also known by the term "Rear Cross-Traffic Alert" (RCTA). Such a system is offered, for example, by Continental at the link "http://www.continental-automotive.de/www/automotive_de_de/themes/passenger_cars/chassis_safety/adas/rcta_de.html": "The park out assist, Rear Cross-Traffic Alert (RCTA), uses the same radar infrastructure as during the detection of vehicles in a blind spot (blind spot detection, BSD) and can avoid accidents which occur when exiting a parking space and which often cause relatively serious collisions and can also result in injury to persons. The new function is based on two close-range radar sensors which each sense an angle of 120 degrees. If the driver assistance system detects an imminent collision, it alerts the driver with a warning tone and LEDs in the interior rearview mirror. Automatic braking of the vehicle would also be a possible measure."

A method which is known from patent document DE 10 2012 208 998 A1 serves to avoid a collision of a motor vehicle with cross-traffic, in which method, for example, a rearward process of exiting a transverse parking space takes place. In this context it is detected whether there is a risk of collision with cross-traffic. If a risk of a collision is detected, the vehicle is automatically moved back by a certain distance in the forward direction (or rearward direction depending on the previous direction of travel), in order to avoid a collision with the cross-traffic. Alternatively, the method can be used during the forward exiting from an entry (for example from premises). Automatic braking of the vehicle by means of the vehicle brake preferably takes place before the moving back. The cross-traffic comprises, for example, motor vehicles, bicycles or pedestrians.

Patent document DE 10 2012 208 998 A1 assumes that it was already known to detect, by means of a detector, objects moving transversely with respect to the vehicle as it exits from a parking space, and in the case of a risk, to activate a warning device which informs the driver about the obstructing object which is moving transversely with respect to his own vehicle. Consideration has also already been given to the possibility of automatically activating a deceleration device of the vehicle in addition to the driver warning and braking the driver's own vehicle to a stationary state in order to avoid a collision with a cross-traveling vehicle.

An object of the invention is to improve methods and systems for avoiding a collision which are known from the prior art.

The method according to the invention for avoiding a collision of an initially rearward or forward traveling motor vehicle—in particular one which is exiting a parking space—with cross-traffic, comprises the steps of:
detecting whether there is a risk of a collision with cross-traffic;
determining a last possible braking intervention for ensuring that a collision is avoided when there is a risk of a collision with cross-traffic; and
automatic last possible initiation of a braking intervention in order to avoid the collision in the case of a detected risk of a collision if this ensures that a collision is avoided.

The method preferably also comprises the steps of:
determining the speed and/or the gradient with which the accelerator pedal is activated; and
preventing an automatic braking intervention independently of a risk of a collision if the speed or the gradient of the activation of the accelerator pedal exceeds a predefined threshold value.

The method preferably also comprises the steps of:
determining the vehicle speed; and
preventing an automatic braking intervention independently of a risk of a collision if the vehicle speed exceeds a predefined threshold value.

The invention is based on the following considerations.

The Cross-Traffic Alert (CTA) function warns the driver about cross-traffic objects in a situation where a parking space is being exited, in order to assist the driver in avoiding a collision. If the driver does not react independently to the warning in good time, collisions with the cross-traffic can occur.

According to the invention, an active brake fraction function is added to the CTA function. Said brake fraction function detects objects of the cross-traffic and brakes the vehicle in such a way that it comes to a standstill with a safety distance before the driving tube of the cross-traffic object. The function calculates, from the current reaction distance and braking distance of the vehicle components, the latest possible time at which braking would have to be initiated in order to reliably avoid a collision. The braking fraction function brings about the braking automatically and makes this intervention plausible to the driver when there is a lack of reaction by the driver to previous warnings of the CTA function. The driver can at any time override the function by accelerating the vehicle and therefore ease his way forward into the cross-traffic before a detected object. If the driver therefore does not react independently to a hazardous situation, accidents can therefore effectively be avoided.

The above statements relating to the method according to the invention also correspondingly apply to the system according to the invention, and vice-versa. In the text which follows, advantageous exemplary embodiments of the system according to the invention also correspond to advantageous exemplary embodiments of the method according to the invention, and vice-versa.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
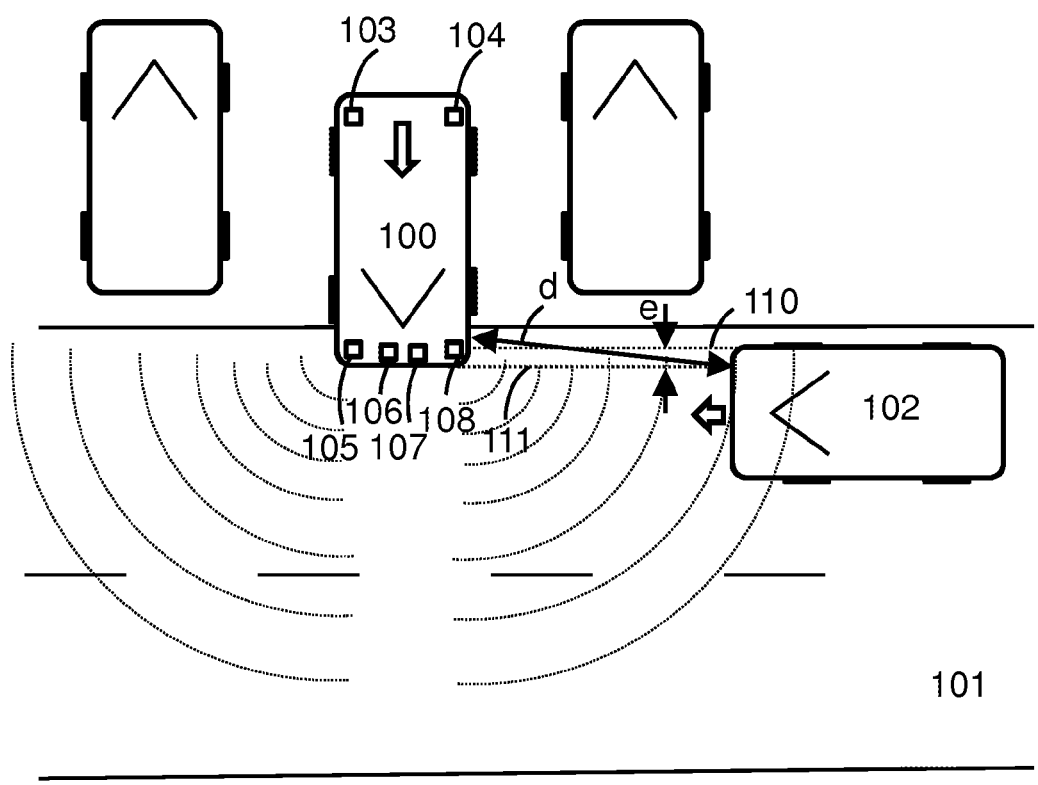
FIG. 1 shows a typical situation of exiting a transverse parking space.

FIG. 1 shows a typical situation of exiting a parking space in a forward or rearward direction, in which the driver moves the motor vehicle 100 out of a parking space which is arranged transversely with respect to the direction of a road 101. The vehicle 100 is equipped with a system for avoiding a collision with the cross-traffic (here the vehicle 102) which is moving on the road 101. The system comprises, in particular, an electronic control device 120 (FIG. 2) with correspondingly programmed functional modules. In addition, the inventive system of the vehicle 100 comprises a sensor system which is arranged, for example, in the bumpers of the rear and front parts of the vehicle 100 and is connected to the control device 120. The sensor system includes, for example, radar sensors, ultrasonic sensors and/or cameras 103 to 108 at the right-hand and left-hand rear and front corners of the vehicle 100. The sensors 103 to 108 serve to monitor the surroundings of the vehicle 100 in the direction of travel. Additionally or alternatively, the sensor system can also have one or more side cameras. The signals of the first sensor system are evaluated in an evaluation device of the control unit 120, in order to detect whether there is a risk of collision with cross-traffic, here with the vehicle 102. As soon as the evaluation device detects there is a risk of collision, continuation of the process of exiting a parking space is prevented, and the vehicle 100 is automatically braked, but only if doing so can reliably prevent a collision with the vehicle 102.

Figure 2:
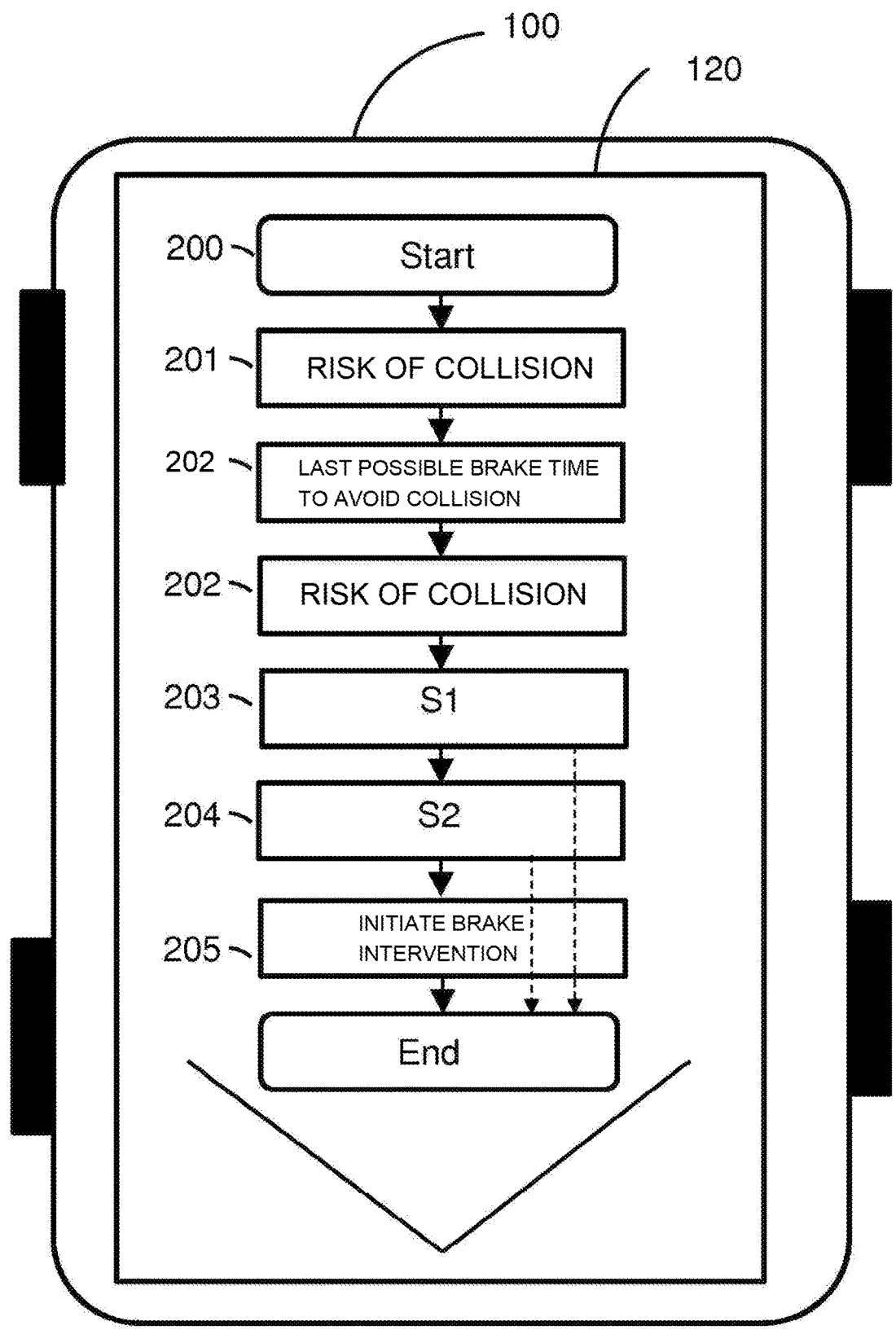
FIG. 2 shows a schematic view of a motor vehicle with a system according to the invention for carrying out an exemplary method for avoiding a collision with cross-traffic in a situation of exiting a parking space.

FIG. 2 shows in more detail the electronic control unit 120 of the vehicle 100 which is correspondingly configured (in particular programmed) to carry out the following exemplary method for avoiding a collision with cross-traffic. The method according to the invention starts in step 200. The method is triggered, for example, by the engine being started by the driver, since this is an indication of the start of a situation of exiting a parking space.

In step 201 it is determined whether there is a risk of collision with the cross-traffic 102. Furthermore, in step 202 the last possible time for an automatic braking intervention to ensure that a collision is avoided when there is a risk of collision with the cross-traffic 102 is determined. In step 205, a braking intervention to avoid the collision in the case of a detected risk of a collision is initiated automatically if this ensures that a collision is avoided. In step 203, the speed and/or the gradient with which the accelerator pedal of the vehicle 100 is activated is preferably determined in advance, and the automatic braking intervention is prevented independently of a risk of a collision if the speed or the gradient of the activation of the accelerator pedal exceeds a predefined threshold value S1, in order, for example, to avoid adversely affecting a somewhat sporty driver or to provide an escape function.

For the same reasons, in step 204 the vehicle speed of the vehicle 100 is likewise preferably determined and the automatic braking intervention is prevented independently of a risk of a collision if the vehicle speed exceeds a predefined threshold value.

In step 202, the vehicle 102 is also detected using the sensors 105 to 108, and a risk of collision with the vehicle 102 which is crossing the direction in which the vehicle is exiting the parking space is detected. In order to detect the risk of a collision, it is possible, for example, to evaluate inter alia how far the vehicle 100 in question projects into the further developed driving tube of the crossing vehicle 102. This is represented in FIG. 1 by the distance e which indicates how far the line 110 projects beyond the boundary line 111 of the motor vehicle 100 along the lateral boundary of the vehicle 102. The speed of the crossing vehicle 102 and the distance d between the vehicles 100 and 102 can also be taken into account for this purpose. A corresponding functional module calculates, from the current reaction distance and braking distance of the vehicle components, the latest possible time at which braking would have to be initiated in order to reliably avoid a collision. The individual steps of the method can be carried out in any desired reasonable sequence.

During the automatic braking of the vehicle 100 in step 205, the vehicle brake is automatically activated and, in addition, the drive torque which is predefined by the position of the accelerator pedal is deactivated, so that the drive engine does not drive the vehicle 100 any longer.

The system according to the invention therefore comprises, in particular, an electronic control unit 120 which is connected to sensors 103 to 108 and has functional modules which are correspondingly programmed to carry out the method steps.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for avoiding a collision of an initially rearward or forward traveling motor vehicle with cross-traffic, the method comprising the steps of:
   detecting whether there is a risk of a collision with the cross-traffic;
   determining a last possible braking intervention for ensuring the collision is avoided when there is the risk of the collision with the cross-traffic; and
   automatically initiating a braking intervention at a last possible moment in order to avoid the collision in the case of the detected risk of the collision if such initiating ensures that the collision is avoided,
   wherein the cross-traffic is moving in a transverse direction with respect to a travel direction of the initially rearward or forward traveling motor vehicle.

2. The method according to claim 1, further comprising the steps of:
   determining a speed and/or a gradient with which an accelerator pedal is activated; and
   preventing an automatic braking intervention independently of the risk of the collision if the speed or the gradient of the activation of the accelerator pedal exceeds a predefined threshold value.

3. The method according to claim 2, further comprising the steps of:
   determining a vehicle speed; and
   preventing an automatic braking intervention independently of the risk of the collision if the vehicle speed exceeds a predefined threshold value.

4. The method according to claim 1, further comprising the steps of:
  determining a vehicle speed; and
  preventing an automatic braking intervention independently of the risk of the collision if the vehicle speed exceeds a predefined threshold value.

5. A system for avoiding a collision of an initially rearward or forward traveling motor vehicle with cross-traffic, comprising:
  a control unit operatively configured to:
  detect whether there is a risk of a collision with the cross-traffic;
  determine a last possible braking intervention for ensuring the collision is avoided when there is the risk of the collision with the cross-traffic; and
  initiate a braking intervention at a last possible moment in order to avoid the collision in the case of the detected risk of the collision if the initiation ensures that the collision is avoided,
  wherein the cross-traffic is moving in a transverse direction with respect to a travel direction of the initially rearward or forward traveling motor vehicle.

6. The system according to claim 5, wherein the control unit is further operatively configured to:
  determine a speed and/or a gradient with which an accelerator pedal is activated; and
  prevent an automatic braking intervention independently of the risk of the collision if the speed or the gradient of the activation of the accelerator pedal exceeds a predefined threshold value.

7. The system according to claim 6, wherein the control unit is further operatively configured to:
  determine a vehicle speed; and
  prevent an automatic braking intervention independently of the risk of the collision if the vehicle speed exceeds a predefined threshold value.

8. The system according to claim 5, wherein the control unit is further operatively configured to:
  determine a vehicle speed; and
  prevent an automatic braking intervention independently of the risk of the collision if the vehicle speed exceeds a predefined threshold value.

* * * * *